United States Patent Office 2,890,184
Patented June 9, 1959

2,890,184

HARDENING MIXTURES OF EPOXY RESINS AND POLYAMIDE-LIKE CONDENSATION PRODUCTS AND THE PROCESS OF PRODUCING THE SAME

Wolfgang Foerster, Sao Paulo, Brazil, assignor to Reichhold Chemicals, Inc., Detroit, Mich.

No Drawing. Application April 24, 1956
Serial No. 580,186

Claims priority, application Germany February 14, 1956

5 Claims. (Cl. 260—18)

The invention relates to hardening mixtures of epoxy resins and polyamide-like condensation products and the process of producing the same, and the present application is a continuation-in-part of my application Serial No. 567,750, filed February 27, 1956, entitled New Polyamide Like Condensation Products and Process of Producing the Same, corresponding to German application R. 17,477, the entire disclosure of which is hereby incorporated by reference as part of the present application. My aforesaid application relates to a process for producing new polyamide-like products which comprises epoxidizing at least one member of a group consisting of vegetable and animal fatty acids and their esters, and mixtures thereof, and converting by heating with a member of a group consisting of aliphatic diamines and polyamines. More particularly, said process comprises a process for the production of new polyamide-like condensation products, characterized by the fact that a member of a group consisting of unsaturated fatty acids epoxidized in known manner, epoxidized mixtures of such unsaturated fatty acids and their esters from alcohols boiling not above 200° C., are converted by heating with a member of a group consisting of diamines and polyamines.

So-called epoxy-resins, i.e. such products as possess the radical

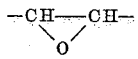

at least twice in their molecule, are very reactive and can be cured by polymerization with many different substances which react with the epoxy-radicals, i.e. be transformed into the insoluble and infusible state.

The epoxy-resins used almost exclusively can be obtained in a relatively easy manner by reaction of bi- or poly-valent mono- or polynuclear phenols with epichlorohydrin in an alkaline solution. A fairly extensive use is enjoyed, for instance, by such epoxy-resins as are obtained from epichlorohydrin and bisphenol, the latter being the reaction products of an acidic condensation of 2 moles of phenol with 1 mole of acetone. Such epoxy-resins have the following formula, the factor $n$ fluctuating within certain limits, depending on the ratio of bisphenol to epichlorohydrin:

higher temperatures. Polyamide resins, obtained in the conventional reaction of di- and trimeric unsaturated fatty acids with ethylene diamine, diethylene triamine, or similar polyamines, are also known as hardening agents for epoxy-resins that will react at more moderate temperatures, and they have the advantage, as opposed to the di- and polyamines, of not being volatile. Further, it is evident that films or masses of fully cured epoxy-resin-polyamide copolymers are convertible to a greater degree than those of epoxy-resin-polyamine mixtures. These polyamide resins also generally possess free amino- or imino-radicals and, when prepared, for instance, from dimeric unsaturated fatty acids and diethylene triamine in a molar ratio of 1:1, they may be considered as amino-polyamides, in which two of three basic notrogen radicals are united like amides and one remains unchanged.

The novel polyamide-like condensation products described in my application Serial No. 567,750, filed February 27, 1956, have a molecular structure of quite a different kind. They are obtained by the reaction of an epoxy-substituted unsaturated fatty acid or its mono-alcohol ester with a polyamine, wherein, when using diethylene triamine, for instance, of three basic nitrogen radicals only one will be united like an amide. The second nitrogen radical is transformed into a substituted amino-radical whose neighboring C-atom carries a free hydroxyl radical, according to the following formula:

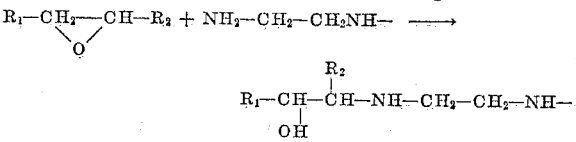

wherein $R_1$ is an alkyl group and $R_2$ is a carboxyl or ester group. The third nitrogen radical of the diethylene tetramine remains unchanged. Thus the result is that, in the reaction of a practically bi-functional epoxy-fatty acid with, for instance, diethylene triamine in a molar ratio of 1:1, on the average only one of the three amino- or imino-radicals acquires an amide-like and, therefore, sharply weakened basic character. On the other hand, in the known condensation of a dimeric fatty acid, i.e. one that is bi-functional only through carboxyl-radicals, with diethylene triamine, practically speaking, two of three amino- or imino-radicals must be united like amides for a higher molecular resin to result. Furthermore, a dimeric fatty acid which is bi-functional toward amines has about twice the molecular weight of a bi-functional epoxy-fatty acid so that the polyamide-like condensation products of my application Serial No. 567,750, combined with diethylene triamine, for instance, contain substantially more free amino-radicals percentage-wise than polyamide resins of dimeric fatty acids and, for example, diethylene triamine.

It has now been discovered that hardening mixtures of epoxy-resins with polyamide-like condensation products may be obtained at moderate and higher temperatures,

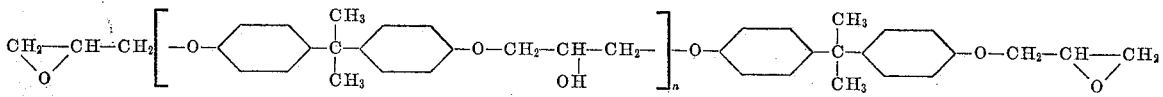

Of those materials known to be suitable as hardening agents, the following may be mentioned: dicarboxylic acids or their anhydrides and amines, di- or polyamines, e.g. ethylene diamine, diethylene triamine, and the like. Whereas acids and anhydrides react with the epoxy-radicals only at higher temperatures, the amines have the great advantage of setting the epoxy-resins even at low temperatures, without, however, excluding hardening at the condensation products being produced in accordance with patent application Serial No. 567,750 by the reaction of epoxy-fatty acids or their esters with, say, diethylene triamine or similar polyamines. Since the polyamide-like condensation products produced in accordance with patent application Serial No. 567,750 may tend to cloudiness of unknown origin, a small amount of epoxy-resin is preferably added during preparation and after termination of the condensation for use of these synthetic resins in the present invention. This small amount of epoxy-resins is to be so correlated with the epoxy-equivalent that soluble and fusible products are obtained.

The compounds of the present invention can be obtained according to the intended use, by mixing of the resins which are liquefied at moderate temperatures or by mixing of the cold solutions of both resins. They can be used as lacquers, as synthetic materials, for the preparation of coating or laminating materials, as glues, and for similar purposes. Prompt processing is recommended. Mixtures of this sort may be pigmented and may be compatible with still other synthetic resins to be tested for each new case.

*Example I*

300 grs. of epoxy-soybean fatty acids and 124 grs. of diethylene triamine are mixed and heated slowly with agitation under a blanket of an inert gas, such as nitrogen or carbon dioxide, up to 140° C. The flask is connected to a reflux condenser which is fed with warm water so that at the outlet of the condenser a temperature of about 80 to 100° C. prevails. After keeping at 140° for one hour, the reflux condenser is substituted by a descending one, the temperature raised to 180° C. and kept for another hour. Then the batch is allowed to cool down to room temperature in an inert atmosphere. After termination of the condensation, 50 g. of an epoxy-resin, with an epoxy-equivalent weight of 450–525, are added to the synthetic resin in solid or dissolved form, according to the intended use. Depending on the temperatures, a reaction between the condensation product and the small amount of epoxy-resin may be expected. This is followed by the additives for the prevention of the possible appearance of cloudiness of unknown origin. For lacquer uses, this product is preferably dissolved in mixtures of about equal parts of a higher aliphatic alcohol and an aromatic hydrocarbon, e.g. i-butanol and toluol. Mixtures with an epoxy-resin (epoxy-equivalent weight of approximately 450–525) in a solid resin ratio of 2:1 to1:2 can be prepared with such a solution, additional solvents with higher dissolving power, such as ethyl glycol and cyclohexanone, being preferably admixed therewith. These lacquers can be hardened after airing, e.g. in 20–30 minutes at 120–150° C., and, particularly in mixture ratios of 1 part solid polyamide resin to 1–2 parts epoxy-resin, result in hard, elastic films that adhere very well, are resistant to light up to about 150° C., and possess excellent resistance to water and chemicals.

*Example II*

310 g. epoxy-soy-bean fatty acid methyl ester and 124 g. diethylene triamine are condensed as in Example I. After termination of the condensation, the synthetic resin is mixed with 30 g. of an epoxy-resin (epoxy-equivalent weight of about 225–290). This mixture is dissolved, as described in Example I, and processed with an epoxy-resin (epoxy-equivalent weight approximately 450–525) to lacquers that possess practically the same good qualities as stated in Example I.

*Example III*

200 g. epoxy-soy-bean fatty acid methyl ester and 123 g. diethylene triamine are condensed as in Example I. After termination of the condensation the synthetic resin is mixed with 50 g. epoxy-resin (epoxy-equivalent weight approximately 450–525). As described in Example I, the mixture is dissolved and processed with an epoxy-resin (epoxy-equivalent weight approximately 450–525) to lacquers that possess practically the same qualities as stated in Example I.

Instead of 50 g. epoxy-resin (epoxy-equivalent weight approximately 450–525), 20 g. epoxy-resin with an epoxy-equivalent weight of 225–290 can also be added to the polyamide-like condensation products.

*Example IV*

200 g. epoxy-linoleic acid methyl ester and 82 g. diethylene triamine are condensed as in Example I and after termination of the condensation the condensation product is treated with 50 g. epoxy-resin (epoxy-equivalent weight 450–525) or with 20 g. epoxy-resin (epoxy-equivalent weight 225–290). As described in Example I, the mixtures are dissolved, and after curing the resulting lacquers, produce coating surfaces with the same good qualities given in Example I.

*Example V*

290 g. epoxy-linoleic acid methyl ester and 179 g. diethylene triamine are condensed as in Example I, and after termination of the reaction, the condensation product is mixed with 72.5 g. epoxy-resin (epoxy-equivalent weight 450–525). As described in Example I, this mixture is combined with an epoxy-resin (epoxy-equivalent weight 450–525) to lacquers that produce hardened films with the same good qualities given in Example I.

*Example VI*

310 g. epoxy-linoleic acid methyl ester and 191 g. diethylene triamine are condensed as in Example I, and after termination of the reaction the condensation product is mixed with 31 g. epoxy-resin (epoxy-equivalent weight 225–290). The remaining processing is suitably conducted according to the method described in Example I. After hardening, lacquer films with the same good qualities described in Example I are obtained.

*Example VII*

(a) An epoxy resin was made by heating under reflux 141 parts of phenol, 64.5 parts of 35% aqueous formaldehyde solution and 1.4 parts of oxalic acid for 2–3 hours. 60 parts of sodium hydroxide, dissolved in 600 parts of water were added and the mixture stirred with 139 parts of epichlorohydrin for 30–60 minutes. The resin was washed and dehydrated.

(b) A polyamide-like condensation product was made by heating 500 parts of epoxidized linseed oil fatty acids (oxirane oxygen content 4.2%) with 211.5 pts. of diethylene triamine under insert gas to about 180–200° C. for 1–2 hours and a sticky resin was obtained.

(c) 100 pts. of epoxy resin (a) are mixed with 25 pts. phenyl glycidyl ether at 60–70° C. At this temperature 50 parts of polyamide-like resin (b) is added and well mixed. The mixture is poured at a temperature of 60–70° C. into an open mold furnished with separators and cured for about 25–30 minutes at 100–110° C. Even without reinforcement with glass fibers, a yellowish brown, infusible and insoluable mass is obtained of unusual hardness and mechanical solidity.

The invention has been described in detail for the purpose of illustration, but it will be obvious to those skilled in the art that numerous modifications and variations may be resorted to within the scope of the accompanying claims without departing from the spirit of the invention.

I claim:

1. A process for the preparation of hardenable mixtures of epoxy resins and polyamide-like condensation products suitable for use as plastic materials, lacquers, adhesives and the like, which comprises combining (1) an epoxy resin produced by etherification of a member of the group consisting of polyhydric mono- and polynuclear phenols with epichlorhydrin an alkaline solution, said epoxy resin having an epoxy equivalent weight of 225–525, with (2) a polyamide-like condensation product formed by epoxidizing at least one member of the group consisting of ethylenically unsaturated vegetable and animal fat acids and esters thereof with a saturated aliphatic monoalcohol having a boiling point not above 200° C. and mixtures thereof, and heating with an aliphatic polyamine selected from the group consisting of primary and secondary polyamines represented by the formula R—NH—CH$_2$—CH$_2$—NH$_2$, where R is a member of a group consisting of H and —(CH$_2$CH$_2$NH$_2$) in such a ratio that the amino or imino groups predominate over the total number of epoxy, ester and carboxyl groups, for at least one hour at about 180–200° C.

2. A process as set forth in claim 1, wherein the epoxy resin is 50–80% by weight, and the polyamide-like condensation product is 20–50% by weight of the mixture.

3. A process as set forth in claim 1, wherein ingredients (1) and (2) are combined while dissolved in an inert solvent.

4. A process as set forth in claim 1, wherein ingredients (1) and (2) are combined in a molten state.

5. A hardened product of the process of claim 1.

References Cited in the file of this patent

UNITED STATES PATENTS

| | | |
|---|---|---|
| 2,445,892 | Swern et al. | July 27, 1948 |
| 2,458,484 | Terry et al. | July 4, 1949 |
| 2,500,600 | Bradley | Mar. 14, 1950 |
| 2,682,514 | Newey | June 29, 1954 |

OTHER REFERENCES

"Alloying With Epoxies," John Charlton, Modern Plastics, 32, vol. 1 (1954).